(12) United States Patent
Thorstensen et al.

(10) Patent No.: US 9,718,993 B2
(45) Date of Patent: Aug. 1, 2017

(54) GREEN CERAMIC TAPES AND METHOD FOR THEIR FABRICATION

(71) Applicant: Keranor AS, Oslo (NO)

(72) Inventors: Bernt Thorstensen, Oslo (NO); Maelenn Le Gall, Oslo (NO)

(73) Assignee: Keranor AS, Oslo (NO)

( * ) Notice: Subject to any disclaimer, the term of this patent is extended or adjusted under 35 U.S.C. 154(b) by 200 days.

(21) Appl. No.: 14/398,741

(22) PCT Filed: May 10, 2013

(86) PCT No.: PCT/NO2013/050087
§ 371 (c)(1),
(2) Date: Nov. 4, 2014

(87) PCT Pub. No.: WO2013/169121
PCT Pub. Date: Nov. 14, 2013

(65) Prior Publication Data
US 2015/0132549 A1     May 14, 2015

(30) Foreign Application Priority Data

May 11, 2012   (NO) .................................. 20120551

(51) Int. Cl.
*B28B 21/52* (2006.01)
*B28B 3/12* (2006.01)
(Continued)

(52) U.S. Cl.
CPC ................. *C09J 7/026* (2013.01); *B28B 1/48* (2013.01); *B28B 3/126* (2013.01); *B28B 21/52* (2013.01);
(Continued)

(58) Field of Classification Search
None
See application file for complete search history.

(56) References Cited

U.S. PATENT DOCUMENTS 4,965,039 A * 10/1990 Schuetz ................ B22F 1/0059
264/125
6,780,349 B1    8/2004 Lindemann et al.
(Continued)

FOREIGN PATENT DOCUMENTS

EP        2071620 A1    6/2009
JP      08059367 A  *  3/1996

OTHER PUBLICATIONS

Thorstensen, B. et al., "High Volume Production of Ceramic Thick Sheet Materials," Proceedings of the 8th International Conference on Multi-Material Micro Manufacture, Nov. 8-10, 2011, Stuttgart, Germany, pp. 272-274.
(Continued)

*Primary Examiner* — David Sample
(74) *Attorney, Agent, or Firm* — Alix, Yale & Ristas, LLP

(57) ABSTRACT

"Green", ceramic tapes intended as building blocks for making complex, fully ceramic components and devices for electronic-, lab-on-chip-, and sensing applications, the manufacture of which comprises in sequence: I. mixing of a ceramic "green" paste, II. homogenisation of a ceramic "green" paste, III. dimensioning and optionally structuring the ceramic "green" paste, IV. drying of the dimensioned and structured ceramic paste, in which: step iii) is performed in a combination of an extruder and a calender, the extruder being provided with a circular extrusion die, splitting and unfolding the extruded tube to a flat, continuous tape strip, using methylcellulose or derivatives thereof as binder, and, an additional step chosen among cutting and punching the thus dimensioned and optionally structured "green" paste, thereby making thick, "green" tapes. A method for its manufacture is also contemplated.

11 Claims, 5 Drawing Sheets

(51) Int. Cl.
| | |
|---|---|
| *B28B 3/20* | (2006.01) |
| *C09J 7/02* | (2006.01) |
| *B28B 1/48* | (2006.01) |
| *C04B 35/111* | (2006.01) |
| *C04B 35/14* | (2006.01) |
| *C04B 35/486* | (2006.01) |
| *C04B 35/626* | (2006.01) |
| *C04B 35/636* | (2006.01) |
| *C04B 35/46* | (2006.01) |
| *C04B 35/462* | (2006.01) |
| *C04B 35/565* | (2006.01) |
| *C04B 35/58* | (2006.01) |
| *C04B 35/581* | (2006.01) |
| *C04B 35/584* | (2006.01) |
| *C04B 35/622* | (2006.01) |
| *C04B 38/00* | (2006.01) |
| *C04B 111/00* | (2006.01) |

(52) U.S. Cl.
CPC ............ *C04B 35/111* (2013.01); *C04B 35/14* (2013.01); *C04B 35/46* (2013.01); *C04B 35/462* (2013.01); *C04B 35/486* (2013.01); *C04B 35/565* (2013.01); *C04B 35/581* (2013.01); *C04B 35/584* (2013.01); *C04B 35/58071* (2013.01); *C04B 35/622* (2013.01); *C04B 35/62625* (2013.01); *C04B 35/6365* (2013.01); *C04B 38/00* (2013.01); *C04B 2111/00844* (2013.01); *C04B 2235/602* (2013.01); *C04B 2235/606* (2013.01); *C04B 2235/608* (2013.01); *C04B 2235/6021* (2013.01); *C04B 2235/6025* (2013.01); *C04B 2235/9638* (2013.01); *C09J 2201/122* (2013.01); *C09J 2201/16* (2013.01); *C09J 2203/326* (2013.01); *C09J 2400/123* (2013.01); *C09J 2405/00* (2013.01); *Y02P 40/63* (2015.11); *Y10T 428/24926* (2015.01); *Y10T 428/249969* (2015.04); *Y10T 428/2865* (2015.01)

(56) References Cited

U.S. PATENT DOCUMENTS

| | | | |
|---|---|---|---|
| 2005/0206050 A1* | 9/2005 | Yoshioka | B28B 11/243 264/667 |
| 2007/0057364 A1* | 3/2007 | Wang | C03C 8/02 257/701 |
| 2007/0232740 A1* | 10/2007 | Fujioka | C04B 35/195 524/444 |
| 2007/0243409 A1* | 10/2007 | Terao | B28B 3/206 428/689 |
| 2009/0160105 A1* | 6/2009 | Jaeckel | B22F 3/227 264/639 |
| 2011/0027539 A1* | 2/2011 | Wang | H01L 21/4807 428/174 |

OTHER PUBLICATIONS

Blackburn, S. et al., "Shaping ceramics by plastic processing," Journal of the European Ceramic Society, vol. 28, Issue 7, 2008, pp. 1341-1351.

"MultiLayer" E-Newslatter, vol. 2, Issue 2, Dec. 2010-Mar. 2011, Commissariat a l'Energie Atomique et aux Energies Alternatives [online].

Thorstensen, B. et al., "Plastic processing of ceramic tapes," Workshop on tape development, Mar. 17, 2010, KIT, Karlsruhe, Germany.

International Search Report and Written Opinion dated Sep. 9, 2013 (PCT/NO2013/050087).

* cited by examiner

The picture is reproduced by courtesy of CEA, France.

The picture is reproduced by courtesy of CEA, France.

The picture is reproduced by courtesy of Fraunhofer IKTS, Germany

The picture is reproduced by courtesy of CEA, France

The picture is reproduced by courtesy of Micro Systems Engineering GmbH, Germany The picture is reproduced by courtesy of Micro Systems Engineering GmbH, Germany

GREEN CERAMIC TAPES AND METHOD FOR THEIR FABRICATION

BACKGROUND

The disclosure is related to "green" ceramic tapes a fabrication method for making the same.

"Green" ceramic tapes are today generally made by tape casting. The main purpose for these tapes is in the electronic, sensor, and ceramic industries where customized and dedicated components are made. Tapes for these purposes are stacked after being structured, punched, embossed, printed and adapted to the final use. Generally, the thickness of the tape cast tapes seems to be limited commercially to around 400 μm, with thicknesses obtained in research environments reaching about 700 μm. The sintering of these components takes place after the processing and stacking.

Especially in the electronic industry sophisticated, multilayered components are made with the low temperature cofired ceramic (LTCC) tapes, where electric components and electric connections are printed onto the "green" tapes before a lamination and sintering occur. Tape cast tapes or films are generally limited in thicknesses to some few hundred micrometers. This works well for pure electronic, stacked components. However, components like a lab-on-chip (LOC) and sensors sometimes demand coarser channels and structures. In order to achieve this, several tape cast films will have to be structured, cut, and laminated to make up a sufficiently thick structure. The precision of the deep details in the laminated structure may in many cases be insufficient. For devices made to utilize a temperature difference (thermoelectric devices), the devices will often need insulating material thicknesses of the order of 1 mm or above. With conventional tape cast tapes, this means again that a high number of thin tapes will have to be structured (cut, punched) and then laminated, again with lack of accuracy.

SUMMARY

The disclosure provides improved "green", machinable, ceramic tapes, which can be manufactured with high precision and in a cost-effective manner.

Also provided is a method of high-speed and direct in-line manufacturing and structuring of green tapes for subsequent component manufacture.

The disclosure provides a continuous, low cost fabrication method for the purpose of making thick, "green", machinable ceramic tapes of high precision. By "thick tape" as used herein should be understood tapes thicker than what is easily produced by tape casting, i.e. around 300 μm. The fabrication method is a cost-efficient method, well suited for an in-line, continuous production, but the production may also be performed in a segmented, non-continuous manner. The manufacturing method is utilizing a combination of a high speed mixer, an extruder, and a calender/roll, ensuring both an excellent mixing and homogenisation of the "green", ceramic paste, as well as a very good and accurate dimensioning of the component. These steps are preferably performed in-line, resulting in a high production speed. The method creates a sheet product that can be structured during the roll forming step, alternatively to be deep drawn, stamped, or structured in a more complex way in a successive, external step. This innovative fabrication method allows a simple, efficient and high-volume production, and is therefore a simple, flexible, and cheap way to produce thick, "green", ceramic tapes.

All ceramic materials can be used for making the tapes, as e.g. the oxide based LTCC (low temperature cofired ceramics), zirconia, silica or any glass based material, alumina, titania and titanates; the nitride based aluminium nitride, silicon nitride; the carbide based silicon carbide; the boron based titania diboride. The ceramic material can be present in the material recipe as particulates, granules, fibres, platelets, or any other shape. With an optimized material structure, the thick, "green" ceramic tapes can be made as uniform, isotropic and homogeneous components, or with a simple laminated structure. The thick, "green" ceramic tapes can be made as a monolithic component: as a flat, unstructured sheet component or as a structured component with e.g. grooves or designed pattern. The structuring can either be punching or cutting through the tape or an embossing or engraving of a pattern into one or both of the faces of the tape.

The fabricated thick tapes will act as a tape for processing into useful components, e.g. in the electronic, sensor, and fluidic industries.

DETAILED DESCRIPTION

Described herein is a continuous or segmented, low cost but high-precision fabrication method for the purpose of making thick, "green" ceramic tapes intended as a building block for making complex, fully ceramic components and devices for electronic-, lab-on-chip-, and sensing applications. These devices are always realized by the sintering of the "green", processed and mounted, ceramic building block.

For a more complete understanding of the technology upon which the inventive tape and method is based, the following aspects of ceramic components fabrication are elaborated below:

THE SEPARATE TECHNICAL STEPS OF FABRICATION,
THE FEED MATERIAL FORMULATION,
THE STRUCTURING OF THE COMPONENTS,
THE FINISHING OF THE COMPONENTS,
THE APPLICATIONS OF THE COMPONENTS.

The Separate Technical Steps of Fabrication

Figure 1:
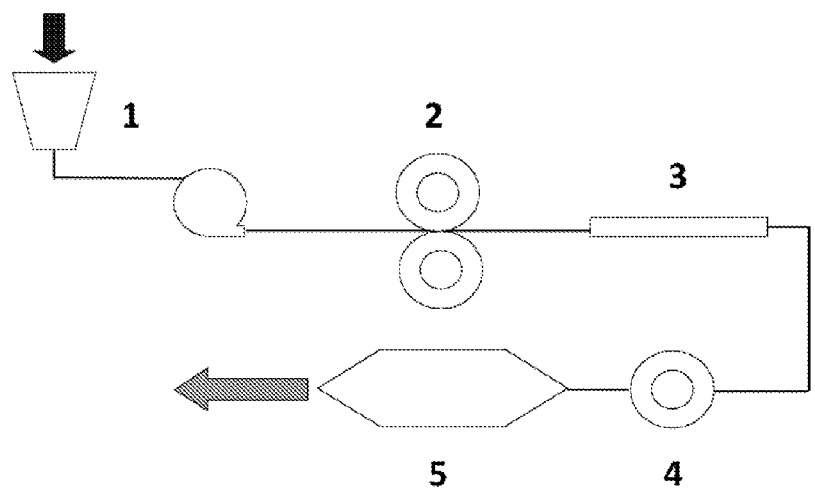
FIG. 1: Schematic representation of the innovative fabrication process, wherein (1) represents the paste mixing and homogenization and the first dimensioning steps, (2) the second (precision) dimensioning and structuring step, (3) the drying step, (4) the cutting step, and (5) the sintering step.

FIG. 1 shows a flow diagram representation of the continuous, in-line fabrication method. The fabrication can also be performed in an off-line process with separated fabrication steps, not linked into a line. The specific steps are however necessary steps in the process, and can be represented either by a single, physical processing unit or two or more physical units in combination in order to meet the objectives of the described step. The essential steps in the fabrication method are the paste mixing and homogenization, the dimensioning, and the structuring. The numbers refer to those of FIG. 1:

Paste mixing and homogenization (1). The "green" feed material is first mixed and homogenized. This process can preferably take place in two steps, first by the use of a high-speed intensive rotary mixer, ensuring a homogeneous mix of the ingredients and at the same time granulation of the homogenous material. This step is preferably combined with an extruder. The extruder will further improve the paste homogeneity due to an enhanced shear force during processing. This should however not exclude any other efficient method for mixing and homogenization.

The paste delivered from this step is preferably a sheet material ready for the following step.

Dimensioning and structuring (2). The dimensioning and structuring is taking place in the extruder and a roll forming or calendering unit. By using a tubular/circular exit die with a splitting device at the outlet of the extruder, one creates a sheet product with constant thickness, thus avoiding the difficulties obtained with a linear slit that has to be shaped as a "dog-bone" (due to die friction. The "dog-bone" shaped, linear slit will challenge the sheet forming during the rolling/calendering, which may cause an uneven, final sheet thickness or edge cracking). The final accurate dimensioning will then take place in the roll/calender. The number of the roll sets (one or multiple sets) can be chosen for the specific application or product. This will guarantee for the surface quality and the exact dimensioning of the "green" product. Also by structuring one or both of the rolls, a pattern or structure can be printed or embossed into the "green" product. This covers both a partial imprint and embossing as e.g. when fins for enhanced heat transfer are wanted, and a partial perforation of the product for easy removal of single components.

The shaping and structuring of the paste/component could in principle also be done at the extruder. However, for ceramic pastes the surface quality and the dimensional accuracy would then not be as good as after the rolling/calendering. Thick, "green" tapes and components made by the disclosed method should therefore be rolled/calendered for achieving high quality, dimensional accuracy, and structure (if needed).

If wanted, different ceramic materials can be laminated in the rolling/calendering step, providing special properties for the component; compositional, chemical or structural. These laminated structures will appear as monolithic structures, with isotropic and homogeneous properties within each layer.

The drying (3) of the "green" tapes can take place directly after the roll shaping/calendering, and is preferably an in-line, continuous process step. Air, dry or wet, at room temperature or increased temperature may preferably be used as drying medium, conventionally heated or HF heated. Alternatively the drying can take place after the cutting as a part of the sintering process.

The cutting (4) is a part of the structuring and can take place before or after the drying stage. The single components can be ready cut, but a more cost effective solution is to cut multi-component sheets, so that a large number of single components are joined by a perforated joint, ready to chip off when needed. The handling and further processing (e.g. printing of electric connections) will then be facilitated.

The cutting is organized in-line, as a continuous process step, where the products are cut to sizes or multi-component sheets that suit the sintering step. If necessary, sheets can also be punched or cut to size in an external process step before entering the sintering furnace. The product is delivered as single or continuous sheets or blocks after the cutting step.

The sintering (5) is the first of the post processing steps. The sintering is preferably continuous, but may alternatively be a batch type process, depending on the making of the final products with the ceramic tapes. The post processing, in addition to the sintering, typically includes printing of the outer electric pattern, and the final mounting of the finished component.

Finally the QC, the packing and shipment can take place.

The Feed Material Formulation

The described preferred fabrication method utilizes a feed material in the form of a highly viscous paste with ceramic powder, binder, plasticizer, dispersant, and solvent. Depending on the quality of the ceramic powder material to be used, its size, shape, and properties, the pastes typically comprise: 60-90 wt % ceramic powder, 2-15 wt % binder, 0-10 wt % plasticiser, 0-5 wt % dispersant, and 0-30 wt % solvent. By "highly viscous paste" as used herein is understood a paste having a viscosity sufficient to maintain its physical shape during the process when not exposed to external forces (other than gravity).

All ceramic materials can be used for making the thick tapes, as e.g. the oxide based LTCC (low temperature cofired ceramics), zirconia, silica or any glass material, alumina, titania and titanates; the nitride based aluminium nitride, silicon nitride; the carbide based silicon carbide; the boron based titanium diboride, or a combination of two or more of the materials. The ceramic material can be present in the material recipe as particles/particulates, granules, fibres, platelets, or any other shape. The material recipes can cover tapes intended as dense or porous final, sintered products.

Other inorganic material elements may be added to the ceramic powder, in order to create special properties or a final (sintered) bonding material phase guaranteeing a proper mechanical bonding between the ceramic particles. These material additives often include, but are not limited to, other oxides, based upon oxides from calcium, cerium, lanthanum, silicon, strontium, titanium, and/or zirconium, and derivatives, extensions, mixes, and/or combinations of these.

The binder material can be applied either together with a solvent, or solvent free. The solvent can be either an organic solvent or water. Solvent free binders are usually waxes, gums, and thermoplastic materials that usually demands elevated temperatures during the processing for good mixing and processing. Binders with solvents are generally organic or inorganic materials that can be dissolved in a specific solvent or water, which increases in viscosity when the solvent is removed. Extrusion and calendering generally need pastes with a low amount of binder and solvent.

The thick, "green" ceramic tapes produced by the proposed fabrication method are fabricated with methylcellulose (or derivatives of this) binders and water as solvent, enabling production at room temperature (10-35° C.), which again reduces energy consumption during processing and keeps a solvent-free working environment.

The thick, "green" ceramic tapes produced by the proposed fabrication method are homogeneous with a mainly uniform and isotropic structure. Layered materials will be ideally uniform and homogeneous within each layer. The tape thickness may easily be varied between 0.3 mm and 30 mm, however there are no strict thickness limitations to the method.

The Structuring of the Components

The thick, "green" ceramic tapes can be delivered as a flat sheet or as a structured sheet with e.g. grooves or surface pattern on one or both sides. These patterns are easily achieved in the calender/roll with profiled (grooved) rolls.

Figure 2:
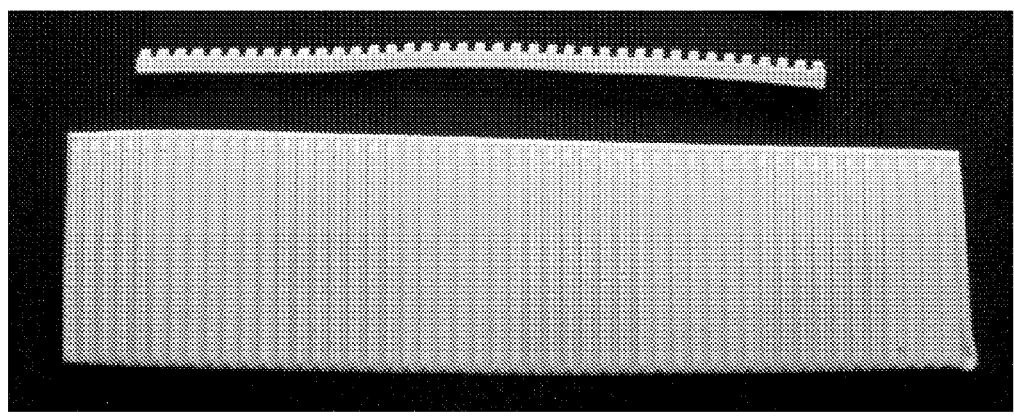
FIG. 2: Picture of a cut-out of a structured, alumina based, "green", thick tape with grooves of 1×1 mm cross-section dimensions and spaced apart by 1 mm.

FIG. 2 shows an example with a thick, "green" ceramic tape, structured on one side. The grooves are here 1×1 mm in cross-section, spaced apart with 1 mm distance. The dimensions, the structure, and the repeatability of the pattern can however be selected for the specific application. This structure is made in the calendering step of the process.

Figure 3:
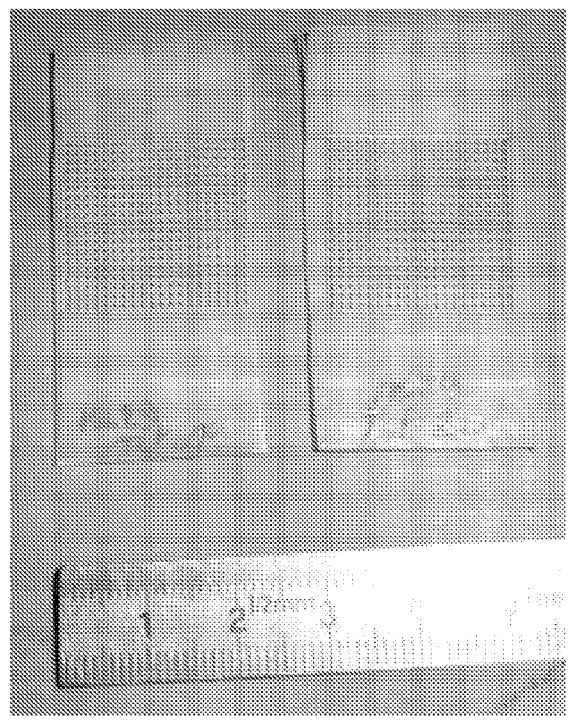
FIG. 3: Picture of 1 mm thick, "green" silica thick tape punched with square holes with side length 0.45 mm. The picture is reproduced by courtesy of CEA, France.

FIG. 3 shows a 1 mm thick silica tape, which has been punched with square holes. The details of the punched holes can be seen in FIG. 4. The precision of the punching process is good. The punching is performed in a post processing step.

Figure 5:
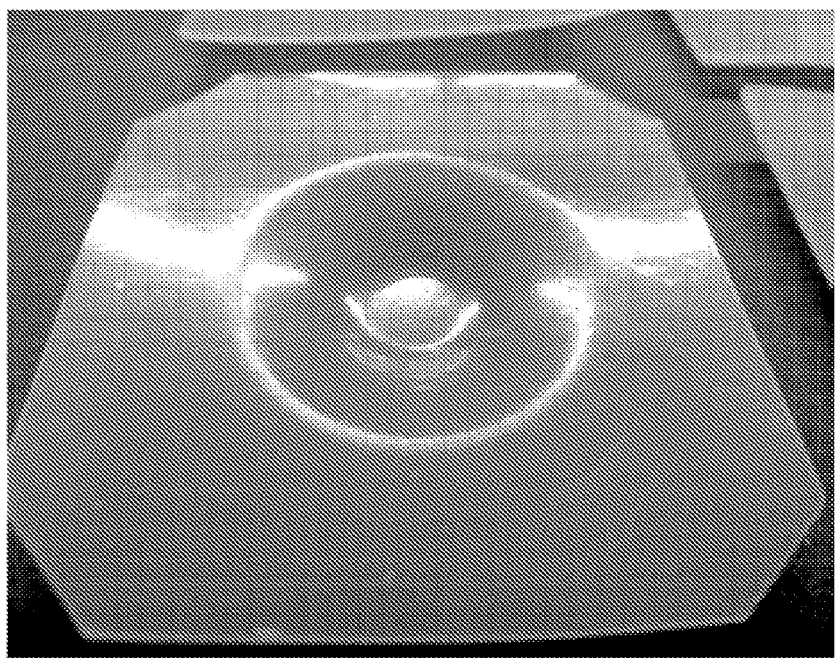
FIG. 5: Picture of a 1 mm thick, "green" silica tape that has been deep drawn. The picture is reproduced by courtesy of Fraunhofer IKTS, Germany.

FIG. 5 shows a 1 mm silica tape being deep drawn. The deep drawing is performed in a post processing step. This shows the machinability of the produced silica tapes.

Figure 6:
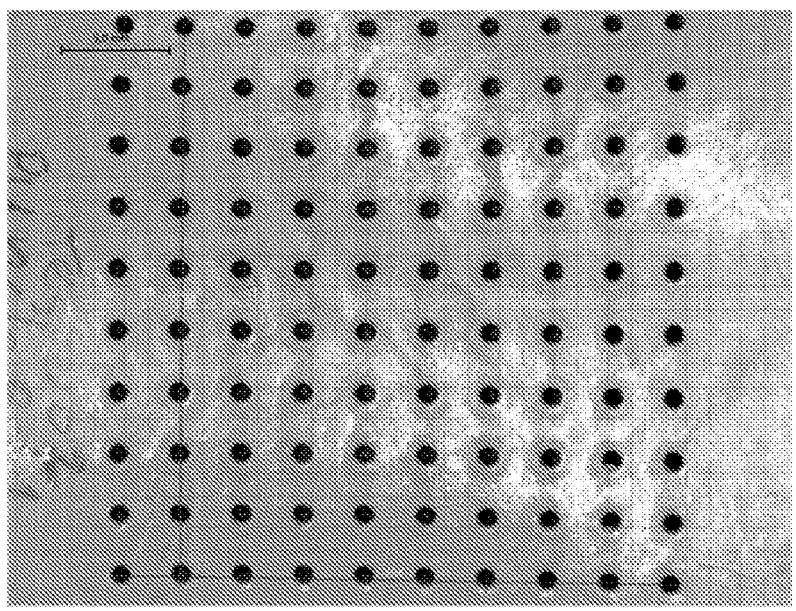
FIG. 6: Picture of 1 mm thick, "green" zirconia thick tape punched with round holes of diameter 1 mm. The picture is reproduced by courtesy of CEA, France.
Figure 7:
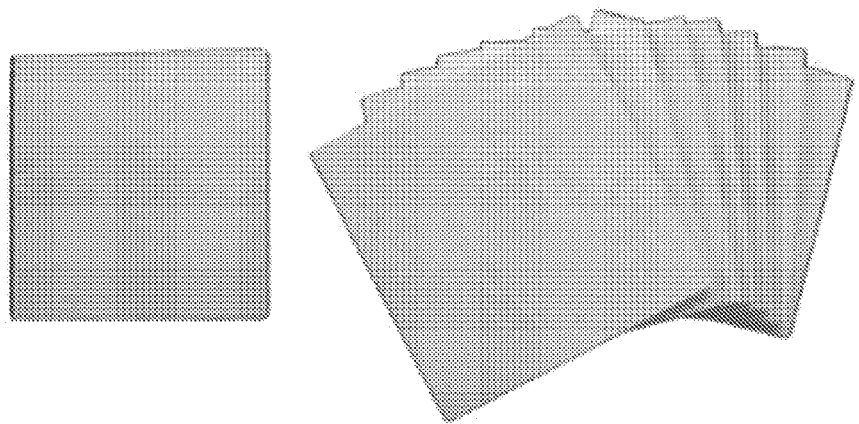
FIG. 7: Picture of 1 mm thick, "green" LTCC thick tapes. The picture is reproduced by courtesy of Micro Systems Engineering GmbH, Germany.

FIG. 6 shows a 1 mm thick zirconia tape, which has been punched with circular holes. The precision of the punching process is good, and shows the machinability of the produced zirconia. The punching is performed in a post processing step. FIG. 7 shows 1 mm thick, "green", produced and cut LTCC tapes.

Figure 8:
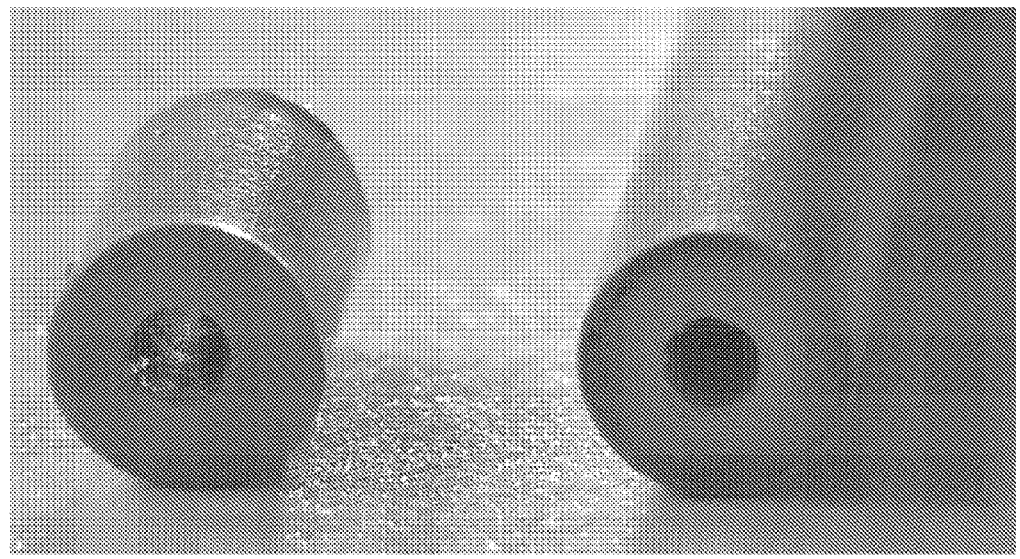
FIG. 8: Picture of a 3 mm diameter, "green" LTCC tube, machined with drilling a 1 mm diameter hole. The picture is reproduced by courtesy of Micro Systems Engineering GmbH, Germany.

FIG. 8 shows LTCC material that has been used for extrusion only in order to make rods. This was done in order to check the machinability of the LTCC material. A hole of diameter 1 mm is drilled through the 3 mm rod without problems. The machinability of the produced LTCC material was good.

Figure 9:
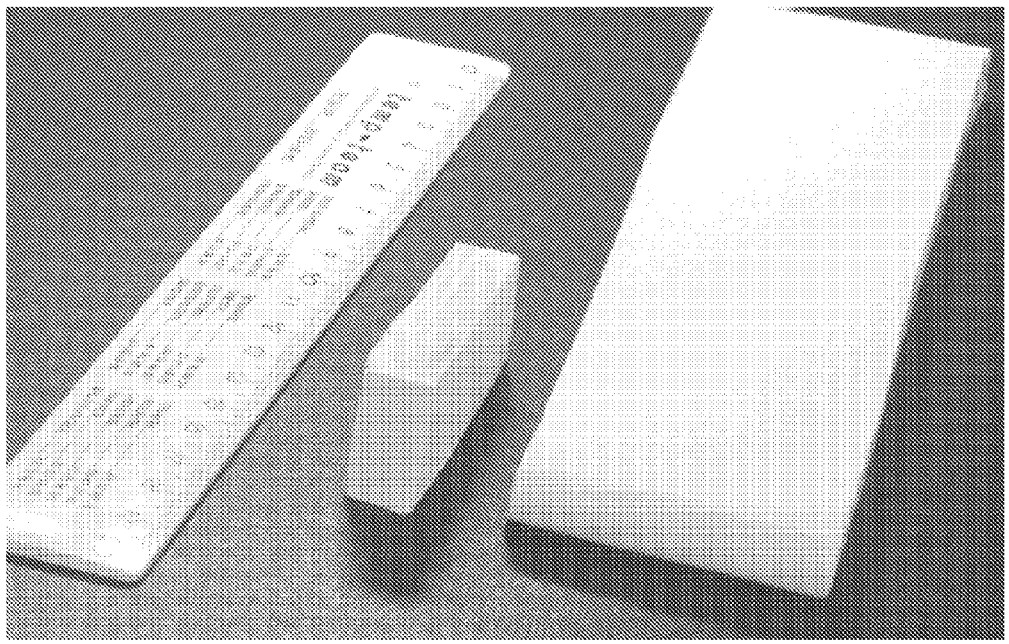
FIG. 9: Picture of a 12.5 mm thick, "green", alumina tape.

FIG. 9 shows 12.5 mm thick, "green", produced and cut alumina tapes.

The Finishing of the Components

The finishing of the components takes place after the calendering, and will generally include sizing of the tape sheets and any printing (e.g.: screen printing, ink jet printing, rotogravure printing or stencil printing) of any additional functional pattern, before the QC, packing and shipping, or final sintering.

The Applications of the Components

The thick, "green" ceramic tapes are intended for the OEM markets in the electronic and sensor/fluidic component sector.

EXAMPLES

Different inventive thick, "green" ceramic tapes have been fabricated and machined according to the inventive method, as described more thoroughly in the following illustrative examples.

Example 1

"Green" alumina thick tape fabricated according to the invention is shown in FIG. 2. This is structured on one side, with grooves of 1×1 mm cross-section spaced 1 mm apart.

The alumina thick tape was fabricated according to the invented method with a paste consisting of: 81.6 wt % ceramic powder, 3.5 wt % binder, 1.9 wt % plasticiser, 0.05 wt % dispersant, and 13.0 wt % water.

Example 2

Figure 4:
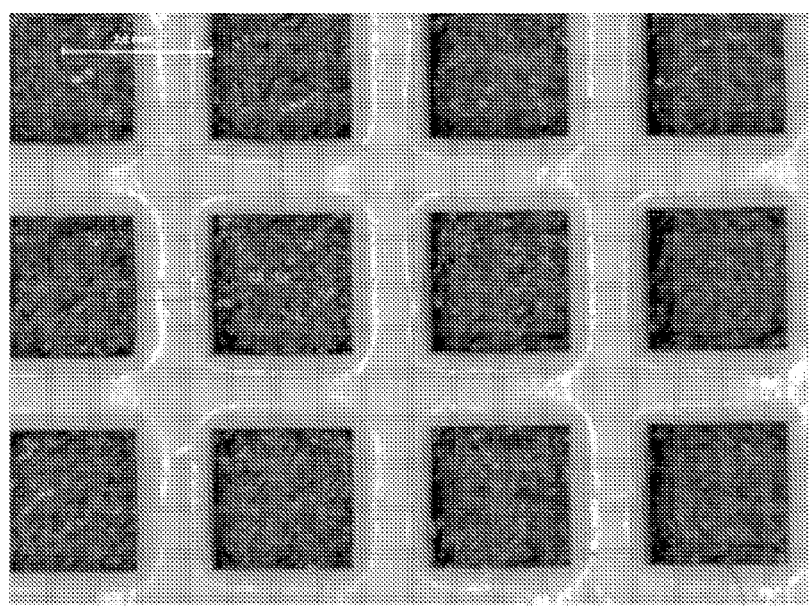
FIG. 4: Picture of the punching details of FIG. 3. The picture is reproduced by courtesy of CEA, France.

"Green" silica thick tape fabricated according to the invention is shown in FIGS. 3 and 4. The tape has a thickness of 1 mm, and has been punched with square holes with side length 0.45 mm. The silica thick tape was fabricated according to the disclosed method with a paste consisting of: 61.6 wt % silica, 4.5 wt % binder, 1.7 wt % plasticiser, and 32.2 wt % water.

Example 3

"Green" silica thick tape fabricated as in Example 2, is shown in FIG. 5. The silica thick tape has been successfully deep drawn.

Example 4

"Green" zirconia thick tape fabricated according to the disclosed method is shown in FIG. 6. The tape has a thickness of 1 mm, and has been punched with circular holes with diameter 1 mm.

The zirconia thick tape was fabricated according to the disclosed method with a paste consisting of: 75.9 wt % zirconia, 6.8 wt % binder, 1.6 wt % plasticiser, 0.5 wt % dispersant, and 15.2 wt % water.

Example 5

"Green" LTCC thick tape fabricated according to the disclosed method is shown in FIG. 7. The LTCC material was the Hereaus material 503K06. The tape has a thickness of 1 mm, and has been punched with circular holes of diameter 1 mm.

The thick tape was fabricated according to the invented method with a paste consisting of: 65 wt % LTCC, 7 wt % binder, 3 wt % plasticiser, and 25 wt % water.

Example 6

"Green" LTCC material, as in Example 5, has been used for extrusion only in order to make rods, see FIG. 8. This was done in order to check the machinability of the LTCC material. A hole of diameter 1 mm is drilled through the 3 mm rod without problems.

Example 7

"Green" alumina tape, 12.5 mm thickness, produced in the same manner described in Example 1 is shown in FIG. 9. The product is a standard, produced thickness, showing the flexibility of the invented fabrication method. In its simplest form the fabrication method according to the present invention may be described as a method for fabrication of thick, "green", ceramic tapes intended as building blocks for making complex, ceramic components and devices, comprising in sequence:
i) mixing a ceramic "green" paste, and
ii) dimensioning and optionally structuring the ceramic paste,
in which the step of dimensioning and structuring the ceramic paste is made in two steps, the first step being extrusion of the paste, and the second being calendering of the extruded paste, allowing fabrication of thick, "green", ceramic tape components.

The invention claimed is:

1. A method of manufacturing a green ceramic tape for use in manufacturing complex, fully ceramic components and devices for electronic-, lab-on-chip-, and sensing applications, comprising the sequential steps of:
  i) mixing a ceramic green feed material into a ceramic green paste;
  ii) homogenizing the ceramic green paste;
  iii) dimensioning and optionally structuring the homogenized ceramic green paste in an extruder provided with a circular extrusion die to yield an extruded tube;
  iv) splitting and unfolding the extruded tube to a flat, continuous tape strip, while including methylcellulose or derivatives thereof as a binder;
  v) surfacing, dimensioning and optionally structuring the unfolded flat green ceramic strip in a calender; and
  vi) drying the dimensioned and structured ceramic paste to yield a green ceramic tape.

2. The method of claim 1, wherein the green feed material comprises approximately 60-90 percent by weight ceramic powder, approximately 2-15 percent by weight binder, approximately 0-10 percent by weight plasticiser, 0-5 percent by weight dispersant, and 0-30 percent by weight solvent.

3. The method of claim 1, wherein the binder is soluble in water.

4. The method of claim 1, wherein steps (i) and (ii) are performed in one from the group consisting of a high shear mixer, high shear kneader, and high-speed intensive rotary mixer.

5. The method of claim 1, wherein steps (i) and (ii) are performed in a high-speed intensive rotary mixer.

6. The method of claim 1, wherein in step (iii), the homogenized ceramic green paste is structured by extrusion.

7. The method of claim 1, wherein in step (v), the unfolded flat green ceramic strip is structured in a calender or roll.

8. The method of claim 1, wherein step (v) is performed in either an in-line process or off-line process.

9. The method of claim 1, wherein step (v) yields either single components or multi-component sheets having a plurality of single components joined by a perforated joint.

10. The method of claim 1, wherein steps (ii) and (iii) are performed at ambient temperature between approximately 10° C. and 35° C.

11. The method of claim 1, wherein each step is performed as part of a continuous, in-line process.

* * * * *